United States Patent [19]

Severson

[11] 4,324,028
[45] Apr. 13, 1982

[54] METHOD OF FABRICATING A SOLAR ABSORBER PANEL

[75] Inventor: Asbjorn M. Severson, Minneapolis, Minn.

[73] Assignee: Honeywell Inc., Minneapolis, Minn.

[21] Appl. No.: 967,767

[22] Filed: Dec. 8, 1978

Related U.S. Application Data

[63] Continuation of Ser. No. 836,803, Sep. 26, 1977, abandoned.

[51] Int. Cl.³ .................. B23P 15/26; B23K 31/00
[52] U.S. Cl. .................. 29/157.3 C; 29/157.3 D;
29/157.4; 29/513; 228/260; 228/183; 228/136;
165/171; 126/444; 126/446; 138/116; 138/166;
138/171
[58] Field of Search .................. 29/157.3 C, 157.3 D,
29/157.3 R, 157.4, 513, 514; 228/260, 256, 183,
136, 137; 165/170, 171; 126/444, 446, 447, 448;
113/118 C, 118 D; 138/166, 171, 111, 116, 117

[56] References Cited

U.S. PATENT DOCUMENTS

| 2,171,790 | 9/1939 | Higham et al. | 29/157.3 C |
| 2,232,176 | 2/1941 | Guthrie | 113/118 D |
| 2,359,926 | 10/1944 | McCullough et al. | 228/183 |
| 2,644,665 | 7/1953 | Cangemi | 29/157.3 D |
| 2,867,417 | 1/1959 | Axlander | 165/171 |
| 3,066,702 | 12/1962 | Tumavicus | 138/111 |
| 3,286,416 | 11/1966 | Ashworth | 29/513 |
| 3,318,376 | 5/1967 | Vihl | 29/157.3 R |
| 3,322,190 | 5/1967 | Johnson, Jr. | 29/157.3 C |
| 3,412,448 | 11/1968 | Landberg | 29/157.3 D |
| 3,550,234 | 12/1970 | Herold | 228/258 |
| 3,858,647 | 1/1975 | Hickman et al. | 29/157.3 C |
| 3,947,947 | 4/1976 | Hess et al. | 29/513 |
| 4,079,781 | 3/1978 | Wesseltoft | 165/171 |

FOREIGN PATENT DOCUMENTS

| 526667 | 9/1940 | United Kingdom | 165/170 |
| 689414 | 3/1953 | United Kingdom | 228/136 |
| 802271 | 10/1958 | United Kingdom | 165/171 |

Primary Examiner—Daniel C. Crane
Attorney, Agent, or Firm—Charles G. Mersereau

[57] ABSTRACT

A low-cost method of fabricating a solar absorber panel for use with a flat plate solar collector system is disclosed in which a plurality of formed elongated substantially U-shaped members are fixed in a predetermined configuration to the reverse side of a single sheet absorber member forming therewith hollow fluid passages or ducts. The fluid duct members are provided with a series of tabs which alternately protrude through spaced slits in the absorber panel such that when the tabs are folded over, a tight interlocking construction is produced. The ends of the single sheet absorber may then be folded to form inlet and outlet manifolds connecting the ends of the series of spaced ducts including closing end tabs or the manifolds may be fabricated of U-shaped tabbed members in the manner of the connecting passages. After the mechanical assembly, the entire unit is sealed as by pumping liquid solder under pressure through the unit. This not only seals the system but also provides a corrosion-resistant coating of solder over all internal parts.

4 Claims, 7 Drawing Figures

METHOD OF FABRICATING A SOLAR ABSORBER PANEL

This is a continuation of application Ser. No. 836,803, filed Sept. 26, 1977 now abandoned.

CROSS REFERENCES TO RELATED APPLICATIONS

Reference is made to a co-pending application by John T. Borzoni and Asbjorn M. Severson, the inventor in this application, Ser. No. 836,805, filed of even date and assigned to the same assignee as the present invention. That application is also concerned with a method of fabricating a flat plate solar absorber panel for use in a solar energy collection system. By that invention a flat plate solar absorber having an integral fluid duct heat transfer system is disclosed which includes formed, flanged fluid duct members arranged on the reverse side of the solar absorber plate in a predetermined fluid flow configuration to form the desired manifolds and elongated connecting passages. The fluid flow duct members and connecting manifolds are fixed in place by separate fastening means and sealed by the use of a sealant which is caused to flow inside the manifolds and connecting passages to seal the interfaces between them and the solar absorber panel and also between the passages and the manifolds by capillary action to produce fluid-tight assembly.

The present invention, while concerned generally with the fabrication of a low-cost solar absorber having an integral fluid heat transfer system, on the other hand, is concerned with a tab type interlocking duct construction and tab type or fold-over manifold construction. Thus, the present invention is directed to distinct, alternate technique in the fabrication of the solar absorber panel.

BACKGROUND OF THE INVENTION

1. Field of the Invention

The present invention relates broadly to the field of solar energy utilization and, more particularly, to a low-cost method of fabricating solar absorber panels having a fluid-type heat transfer system integral with the solar absorber panel.

2. Description of the Prior Art

The rapid depletion of conventional sources of energy has resulted in an ever widening search for alternatives to such widely used sources as petroleum and natural gas to meet the increasing demand for energy in our society today. One such viable source which is presently commanding a great deal of attention in research and development and in the deployment of experimental units is that of solar energy. Solar flat plate collectors may be employed, inter alia, as sources of heat for homes and buildings and for maintaining an adequate supply of hot water in such installations. Generally, the prior art contains many examples of different ways to utilize solar energy absorbed by solar flat plate collectors of various types. Normally a solar absorber plate having a black body surface is utilized to absorb heat from solar radiation and a heat transfer system is operated in conjunction with the absorber plate to remove useful heat from the absorber and conduct it to a place where it is utilized or stored. Solar collector panels have been utilized to heat a variety of fluid media through heat transfer systems utilizing the solar absorber plate. The higher heat transfer coefficient of liquid media together with the higher heat capacity per unit mass exhibited by such materials as opposed to gaseous fluids results in an ability to obtain an efficient use of the solar energy absorbed.

While research in materials of construction and the use of different configurations to achieve more efficient systems is on-going, one of the greatest drawbacks of present-day solar energy systems is the cost. Reduction in the cost of materials and labor in assembling the solar absorber panels including heat transfer media passage systems along with any increase in efficiency is a desired goal.

SUMMARY OF THE INVENTION

In accordance with the present invention solar absorber panels with integral fluid heat transfer systems may be assembled with a saving of both labor and material. In one embodiment, a flat solar absorber plate, normally made of mild steel, is provided with rows of elongated openings or slits disposed in the configuration of the fluid duct system in the central portion thereof and has precut ends such that they may be folded over to form inlet and outlet manifolds. A plurality of separate preformed, substantially U-shaped fluid duct members having integrally formed tab members are also provided such that when they are assembled on the reverse side of the solar absorber member certain of the tabs project or protrude through the openings in the solar absorber panel. The tabs are folded over to produce a tight interlocking construction between the solar absorber plate and the preformed ducts. The ends of the solar absorber panel may then be folded or crimped over to form the inlet and outlet manifolds, including the end closures therefor. The inlet and outlet manifolds may alternatively be formed in the manner of the connecting ducts and fixed to the absorber member with the same tab type assembly. The entire duct-manifold system may then be sealed by utilizing a suitable sealant such as pumping liquid solder of the desired composition through the system both to completely coat the inside steel and to seal all junctures between the fabricated sections.

This system provides an economical method of fabricating solar absorber panels in which both materials and labor are kept to a minimum. Both the solar absorber panels and the tabbed ducts may be readily stamped and formed with a minimum of tooling. Assembly may be done automatically and sealing is accomplished without the need of any external fasteners or such expensive processes as seam welding.

BRIEF DESCRIPTION OF THE DRAWINGS

In the drawings wherein like numerals are utilized to designate like parts throughout the same.

DESCRIPTION OF THE PREFERRED EMBODIMENT

Figure 1:
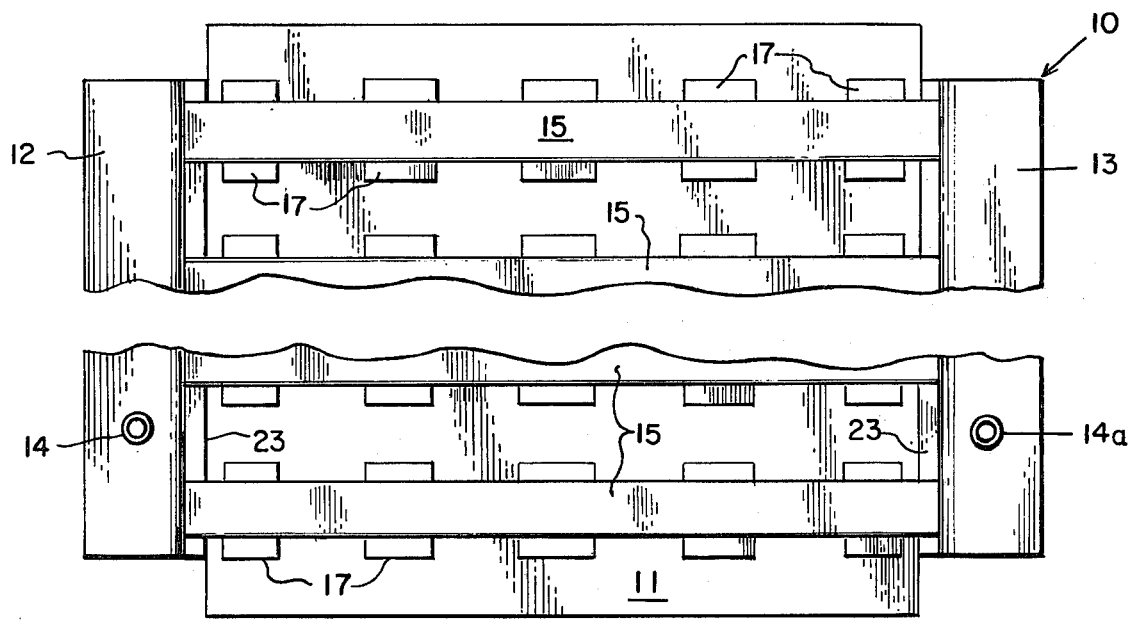
FIG. 1 is a top view of the reverse side of a solar absorber panel fabricated in accordance with the present invention.
Figure 2:
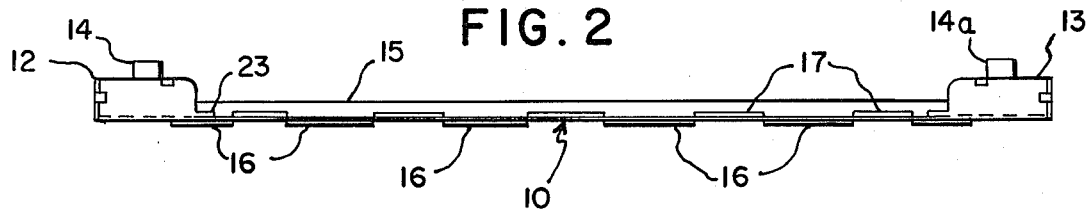
FIG. 2 is a side elevational view of the solar absorber panel of FIG. 1.
Figure 3:
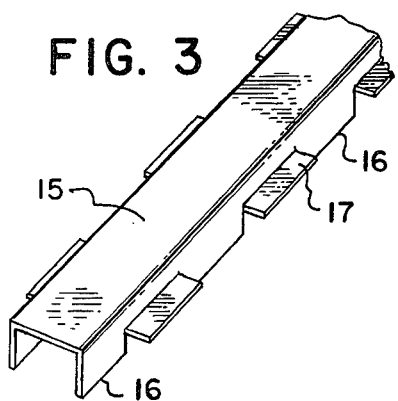
FIG. 3 is an enlarged, fragmentary, perspective view of one U-shaped member of the ducts of FIG. 1 prior to assembly.
Figure 5:
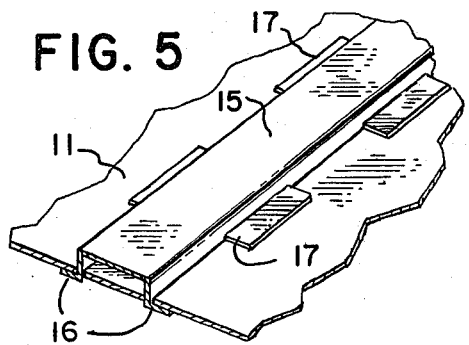
FIG. 5 is an enlarged, fragmentary, perspective view showing an assembled duct.

In FIG. 1 of the drawings there is shown at 10 a representative solar absorber plate assembly produced by the method of the invention. The front or solar absorbing surface of the absorber panel (not shown) normally would be the top surface in an assembled solar collector. The reverse surface of the solar absorber panel is depicted by 11. The fluid-type heat transfer system integral with the solar absorber panel includes inlet and outlet manifolds 12 and 13 having respective inlet and outlet connections 14 and 14a. These, in turn, are connected by a series of spaced, parallel, elongated, hollow heat transfer passages 15 to form the desired fluid flow configuration. Of course, the fluid inlet and outlet connections 14 and 14a may be provided at any desirable place along the manifold according to the desired mode of flow.

The actual preferred method of fabrication of the present invention is depicted in FIGS. 3-6. In the fragmentary perspective view of FIG. 3, a portion of one of the fluid passage members 15 is illustrated in a preformed but unassembled state. As can be seen from that figure, the member is generally U-shaped and has a series of vertical tabs 16 and horizontally disposed tabs 17 formed in both legs of the U. Prior to assembly, the solar absorber plate 10 is provided with a series of openings, normally in the form of punched slits as at 18 (FIG. 4) which are aligned in the desired configuration of the members 15 such that, upon assembly of the members 15 unto the absorber plate 10 the vertical tabs 16 are received in the openings 18. The horizontally bent tabs 17 then align themselves in parallel contact with surface 11 of the absorber plate 10 as the duct 15 is assembled to the absorber plate.

Figure 4:
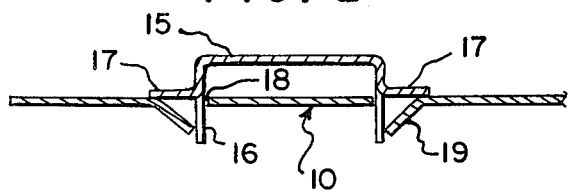
FIGS. 4 and 4a are enlarged front elevational views showing the assembly of the member of FIG. 3 to the absorber plate.
Figure 4A:
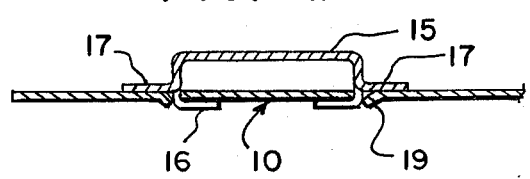

After the ducts have been placed in the desired pattern on the absorber plate 10 such that the tabs 16 protrude through the front surface of the absorber plate 10, the entire duct absorber plate assembly is firmly interlocked by crimping the tabs 16 inward about the absorbing surface of the absorber plate and closing the openings 18 by bending the tabs 19 in an upward manner as shown in FIG. 4a. In this manner, the ducts 15 are securely fastened to the absorber plate 10 to provide a rigid absorber structure. This crimped assembly is shown in the fragmentary perspective view of FIG. 5. The ducts are rigidly held in place by this method in a manner which minimizes the gaps and openings at the interfaces where the ducts are connected to the absorber plate while eliminating the requirement for any welding or the use of any external fastening means to hold the ducts in place.

Figure 6:
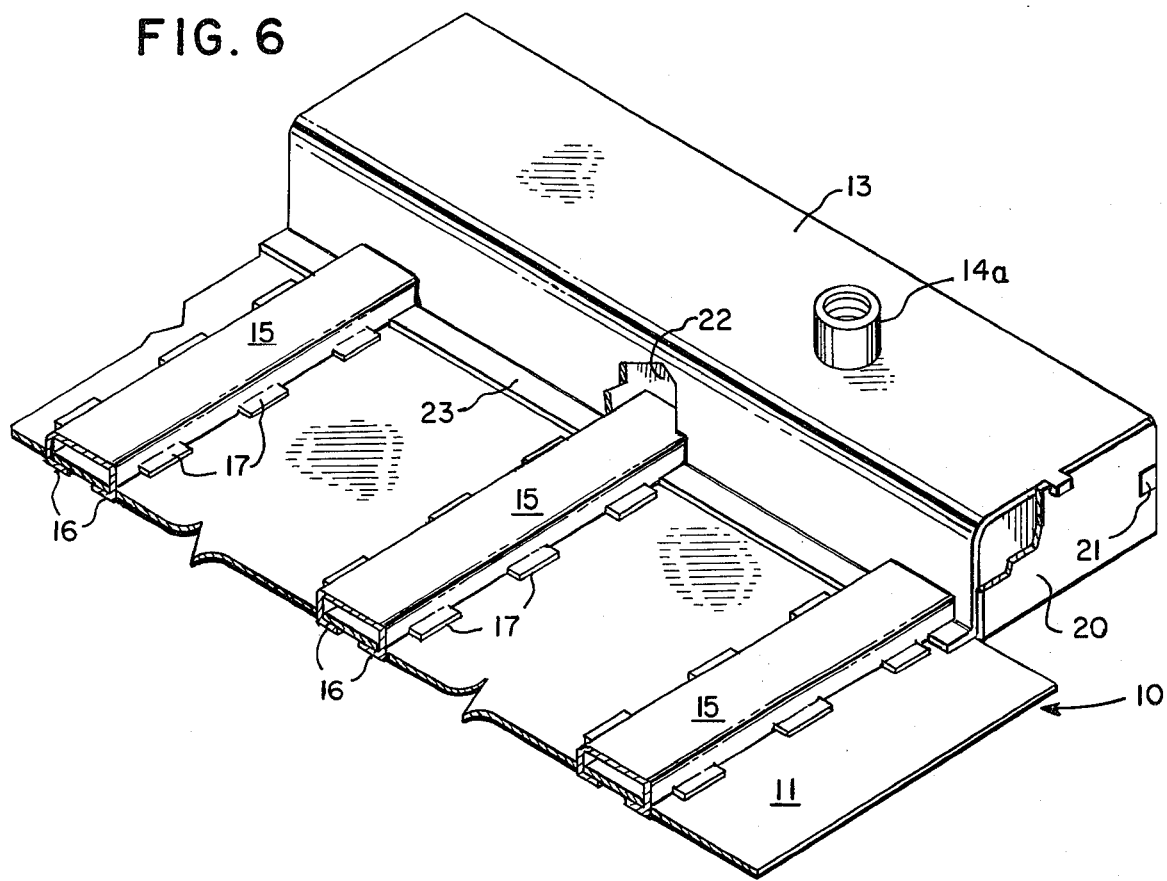
FIG. 6 is an enlarged, fragmentary, perspective view, with parts cut away, showing the manifold and duct assembly of the invention.

As can best be seen in FIG. 6 the absorber plate 10, in addition to having the slots 18 stamped therein, may normally be precut such that the manifolds 12 and 13 may be folded from the ends thereof to provide a one-piece construction. Thus the absorber plate 10 is normally preconstructed such that manifolds 12 and 13 including end pieces 20 may be folded from the ends thereof without need of using additional structural pieces. The end pieces as at 20 may be held in place after the manifold is shaped as by additional tabs 21.

It should be noted that in the normal sequence of construction, as depicted by FIG. 6, the end manifolds 12 and 13 are normally folded in prior to the attachment of the ducts 15 to the solar absorber plate 10. Thus the stamping of plate 10 will include not only the provision for shaping the manifold by later bending and folding of the ends of the absorber plate sheet but also is provided with a series of openings as shown in the cutaway of FIG. 6 at 22 to accomodate the ends of the ducts 15. If necessary the manifold may be spot welded to hold it in place prior to the sealing of the unit as at 23.

Figure 7:
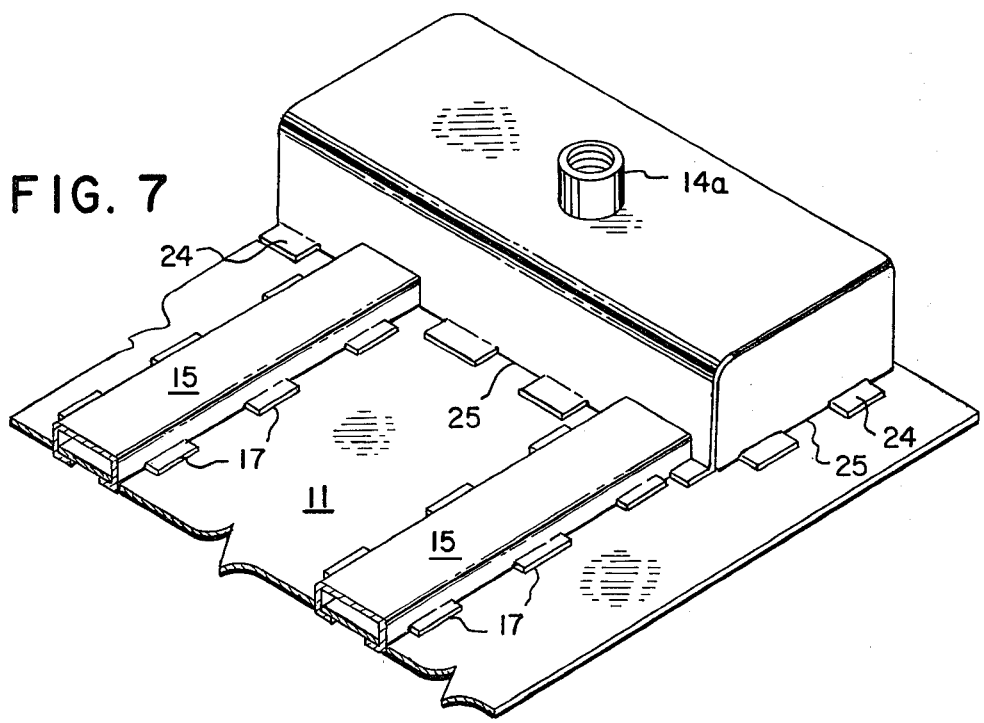
FIG. 7 is similar to FIG. 6 showing an alternate manifold construction.

As an alternative to the fold-over type of construction, the inlet and outlet manifolds may be fabricated in the manner of the connecting ducts utilizing an interlocking tabbed construction. This is illustrated in FIG. 7 wherein tabs 24 correspond to the horizontally disposed tabs 17 and slits 25 to the slits 18. The system of this embodiment, of course, needs no spot welding at all.

Thus the basic simplicity of the construction of the illustrated embodiment of the solar absorber system of the present invention includes a one piece solar absorber plate inlet and outlet manifold construction along with a convenient tubular duct attachment system. It can readily be seen that the strength and rigidity required for the panel are inherent in the fabrication technique of the present invention. The assembled solar absorber panel does not have to depend on external welds or other fastening devices to hold it together and strengthen the unit. All that is required is some simple tooling including stamping and forming dies as but two separate pre-cut parts are required to produce the assembled solar absorber panel and fluid flow system.

After the system has been assembled as described, it remains necessary only to make the assembly fluid-tight. This may be done conveniently as by pumping liquid solder through the system such that the solder flows outwardly filling all interstices between all the parts and completely seals the unit. Because of the construction involved, the assembled unit then does not have to depend upon the strength of the solder to maintain its rigidity. The solder or other suitable sealant is needed only to render this system fluid-tight. Of course, the solder composition may be varied according to the particular application including the intended operating temperature limit of the solar panel. Other sealants or sealing techniques in addition to liquid solder may be used to seal the assembly of the present invention. These include such things as spreading a paste containing solder and flux at the proper positions on the solar absorber plate such that the assembled plate may then be heated to melt the solder and allow it to flow by capillary action into all the junctures and interstices between the parts filling all the seams. Alternately, metallic rods such as rods of a brazing material may be properly placed inside the manifolds and ducts and the system sealed utilizing a conventional brazing furnace.

While the solar absorber plate and associated fluid passage system may be made of any conventional materials having the qualities such as good heat conductance and formability required for the assembly of the invention, in the preferred embodiment they are made of mild steel plate. After assembly of the system, the front or solar-absorbing surface of the solar absorber plate 10 may be treated in any desired or conventional fashion to maximize its solar absorption capabilities. This is normally done by dip coating or painting the solar absorbing surface with a material which renders that surface as close to a black body absorber as possible. Because both the solar absorber plate and the tabs on the ducts 15 are normally made out of the same mild steel plate, the presence of the folded tabs has little or no effect on the overall black body absorption of the front side of the absorber plate once the entire system is coated to produce a black body absorber.

It can readily be seen then that the method of fabricating the solar absorber panel of the present invention utilizes conventional materials, simple tooling and requires no extensive welding or use of labor in the assembly which greatly simplifies the fabrication and reduces the cost. Also, the use of materials is kept to a minimum and the utilization of the reverse side of the solar absorber plate 10 to form one side of the heat transfer ducts 15 increases the efficiency of the heat transfer between the absorber 10 and the fluid media within the ducts 15 by eliminating another duct wall. Almost the entire assembly may be made by simply bending and crimping parts into a strong, rigid, integrated configuration. Extensive welds which might cause warping of the material or other undesirable effects are eliminated from the procedure completely. Thus, all the preformed ducts and absorber plates including the manifolds may readily be stamped from pre-cut steel sheets and preset jigs can be used for setup and assembly.

The embodiments of the invention in which an exclusive property or right is claimed are defined as follows:

1. A method of fabricating a solar flat plate absorber panel having an absorber plate which itself forms part of a duct system for conveying heat from the absorber plate to a heat utilization system comprising the steps of:

providing a plurality of spaced slits in said absorber plate in a predetermined pattern;

providing a plurality of preformed elongated substantially single-thickness, recessed members the walls of which are formed with relatively large integral tab portions including straight tabs extending in a first direction and bent tabs extending in a direction at an angle to said first direction;

assembling said preformed recessed members to one side of said solar absorber plate such that said straight tabs are inserted through said slits and said bent tabs abut the surface of said absorber plate to form therewith manifolds and connecting ducts in a predetermined pattern wherein said absorber plate itself forms one wall of the ducts;

folding said straight tabs flatly against said absorber plate to interlock said recessed members to said absorber plate and to present a substantially flat surface for receiving solar energy; and sealing junctures of the duct system formed by said recessed members and said absorber plate and between said recessed members to render said duct system fluid-tight.

2. The method of claim 1 including the step of forming said manifolds by folding the ends of said absorber plate to form a closed manifold at either end joining connecting the ends of said connecting ducts.

3. The method of claim 1 wherein said duct passages and said absorber plate are metal and wherein said sealant is metal.

4. The method of claim 1 wherein said formed fluid duct passages and said absorber plate are steel and wherein said sealant is solder.

* * * * *